US012613727B2

(12) United States Patent
Ghergu et al.

(10) Patent No.: US 12,613,727 B2
(45) Date of Patent: Apr. 28, 2026

(54) ROBOTIC SHARED ACCESS

(71) Applicant: INTERNATIONAL BUSINESS MACHINES CORPORATION, Armonk, NY (US)

(72) Inventors: Laurentiu Gabriel Ghergu, Bucharest (RO); Erik Rueger, Ockenheim (DE); Filis Omer, Constanta (RO); Jeremy R. Fox, Georgetown, TX (US)

(73) Assignee: International Business Machines Corporation, Armonk, NY (US)

( * ) Notice: Subject to any disclaimer, the term of this patent is extended or adjusted under 35 U.S.C. 154(b) by 407 days.

(21) Appl. No.: 18/215,240

(22) Filed: Jun. 28, 2023

(65) Prior Publication Data

US 2025/0004804 A1 Jan. 2, 2025

(51) Int. Cl.
G06F 9/455 (2018.01)

(52) U.S. Cl.
CPC ................... G06F 9/45558 (2013.01); G05B 2219/50391 (2013.01); G06F 2009/45587 (2013.01)

(58) Field of Classification Search
None
See application file for complete search history.

(56) References Cited

U.S. PATENT DOCUMENTS

| | | | | |
|---|---|---|---|---|
| 10,768,996 | B2 * | 9/2020 | Zhang | ................... G06F 9/5077 |
| 2002/0052913 | A1 * | 5/2002 | Yamada | .............. G06F 16/9535 |
| | | | | 709/202 |

| | | | | |
|---|---|---|---|---|
| 2015/0356773 | A1 * | 12/2015 | Kumar | ................ G06F 9/45558 |
| | | | | 345/520 |
| 2018/0189093 | A1 | 7/2018 | Agarwal et al. | |
| 2020/0252306 | A1 * | 8/2020 | Subramanyam | .... H04L 41/5032 |
| 2021/0146537 | A1 | 5/2021 | Bannoura | |
| 2022/0156108 | A1 | 5/2022 | Anand et al. | |
| 2022/0350722 | A1 | 11/2022 | Dines | |
| 2023/0142070 | A1 * | 5/2023 | Ranganaboina | ........ G06F 3/147 |
| | | | | 715/778 |

(Continued)

FOREIGN PATENT DOCUMENTS

WO 2021167678 * 8/2021

OTHER PUBLICATIONS

Automation Anywhere. "Set Automation Priority for Your Bots. "Jan. 19, 2022, web.archive.org/web/20220706231442/docs. automationanywhere.com/bundle/enterprise-v2019/page/enterprise-cloud/topics/aae-client/bot-creator/working-with-automation-tasks/set-automation-priority.html#. (Year: 2022).*

(Continued)

*Primary Examiner* — S. Sough
*Assistant Examiner* — Selena Sabah Nahra
(74) *Attorney, Agent, or Firm* — Seed Intellectual Property Law Group LLP

(57) ABSTRACT

Aspects of the present invention detect a maximum size of a screen within a same virtual machine allowed by configuration data; determine a number of concurrent bots that access the same virtual machine within a predetermined timeframe; split a width and a height of the screen by the number of the concurrent bots; allocate a sub-screen of a split screen to each of the concurrent bots; and execute a code package for each the concurrent bots within an allocated sub-screen within the same virtual machine in the predetermined timeframe.

20 Claims, 7 Drawing Sheets

(56) References Cited

U.S. PATENT DOCUMENTS

2024/0281878 A1 * 8/2024 Modi ..................... G06Q 40/04

OTHER PUBLICATIONS

Anonymous, Robot User Guide, High-Density Robots, 2022, UiPATH Documentation, https://docs.uipath.com/robot/standalone/2022.10/user-guide/service, Accessed Apr. 26, 2023, 2 pages.
Anonymous, Robot User Guide, Robot Service, UiPATH Documentation, https://docs.uipath.com/robot/standalone/2022.10/user-guide/service, Accessed Apr. 23, 2023, 4 pages.
Anonymous, Robot User Guide, Robot Service, UiPATH Documentation, https://docs.uipath.com/robot/standalone/2022.10/user-guide/service, Accessed Apr. 26, 2023, 3 pages.
Anonymous, What is IBM Robotic Process Automation, https://www.ibm.com/products/robotic-process-automation?utm_content=SRCWW&p1=Search&p4=43700074487969920&p5=e&gclid=CjwKCAjwhdWkBhBZEiwA1ibLmJ4aL0M3vNuLu64hY6YazDlj dPujD8yixkAQzBlw4NwTBEAc3jtLhoCSCoQAvD_BwE&gclsrc=aw.ds, Accessed Jun. 23, 2023, 30 pages.

* cited by examiner

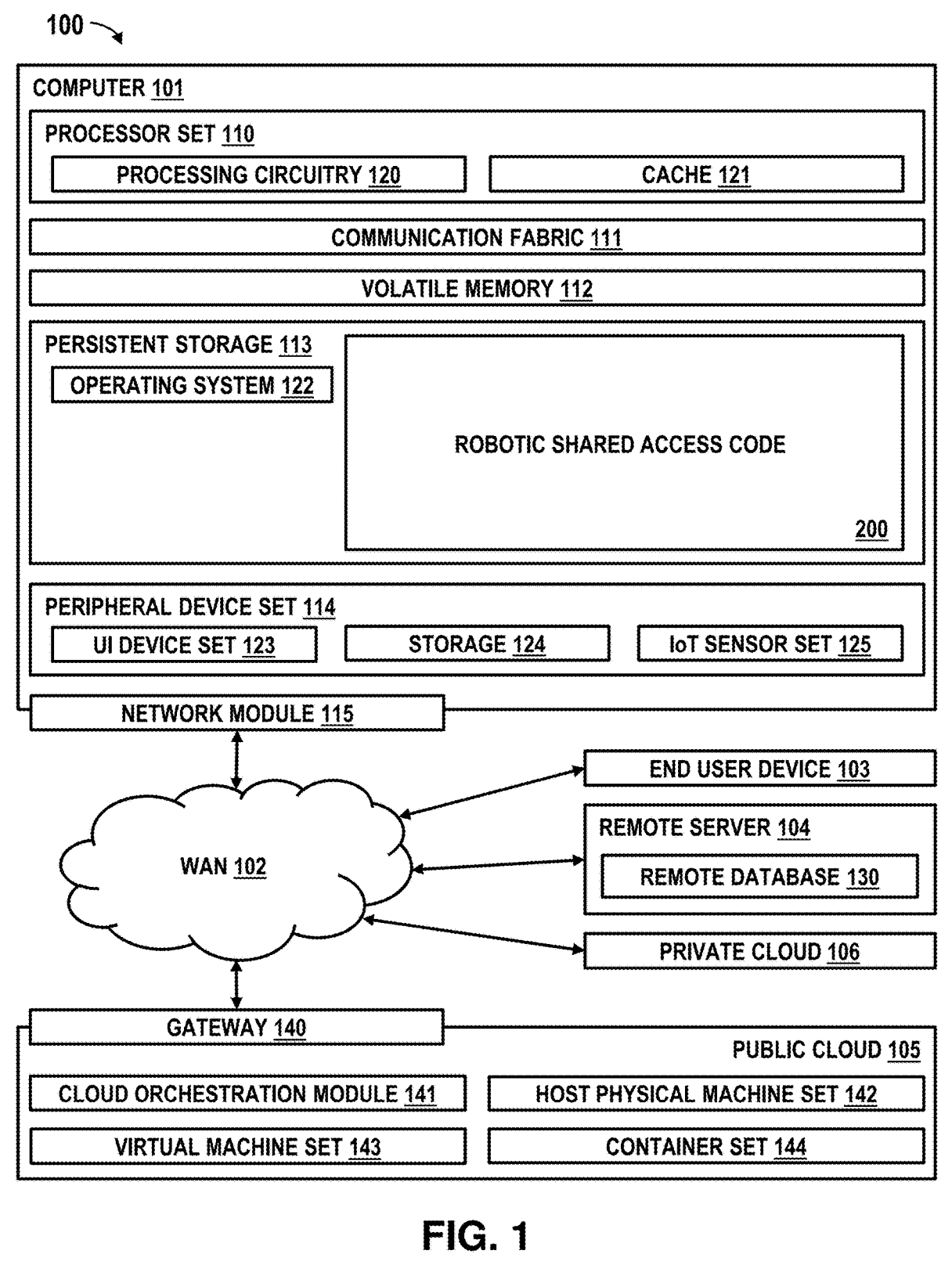

100

COMPUTER 101

PROCESSOR SET 110

| PROCESSING CIRCUITRY 120 | CACHE 121 |

COMMUNICATION FABRIC 111

VOLATILE MEMORY 112

PERSISTENT STORAGE 113

OPERATING SYSTEM 122

ROBOTIC SHARED ACCESS CODE

200

PERIPHERAL DEVICE SET 114

| UI DEVICE SET 123 | STORAGE 124 | IoT SENSOR SET 125 |

NETWORK MODULE 115

WAN 102

END USER DEVICE 103

REMOTE SERVER 104

REMOTE DATABASE 130

PRIVATE CLOUD 106

GATEWAY 140

PUBLIC CLOUD 105

| CLOUD ORCHESTRATION MODULE 141 | HOST PHYSICAL MACHINE SET 142 |
| VIRTUAL MACHINE SET 143 | CONTAINER SET 144 |

FIG. 1

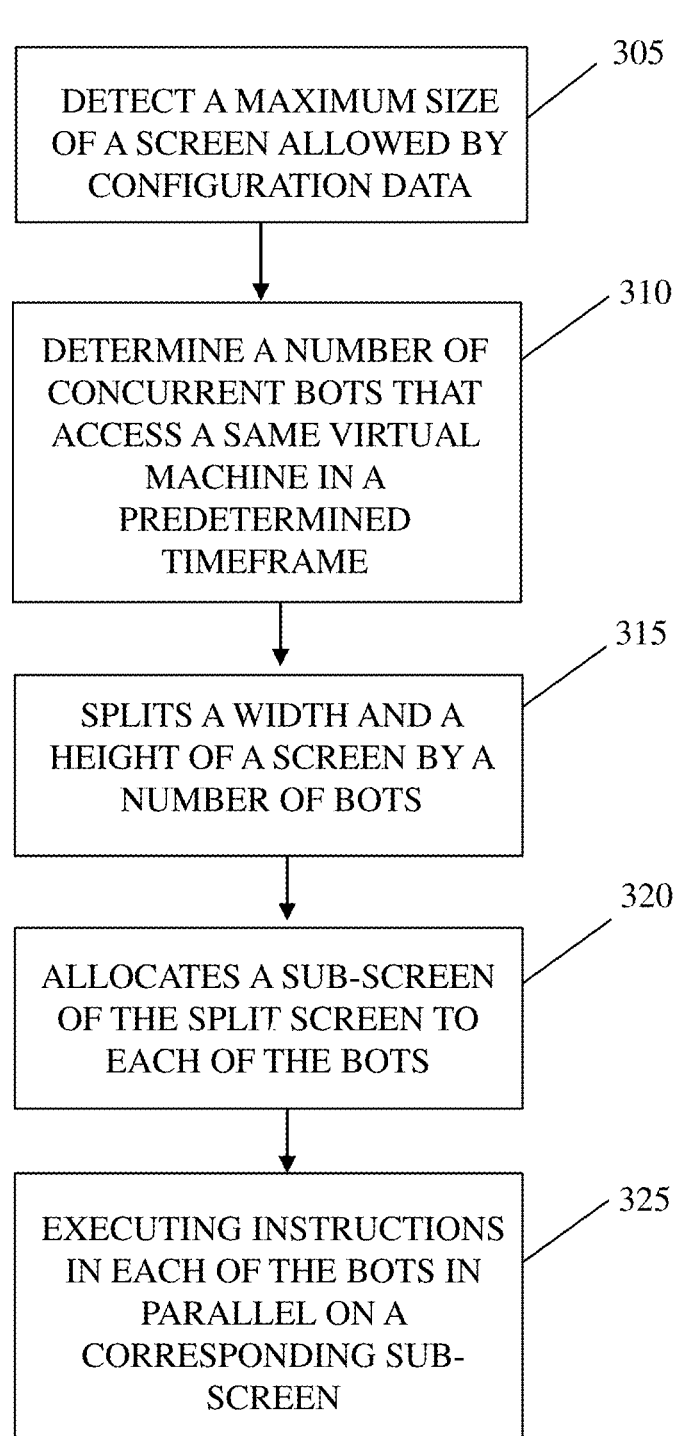

DETECT A MAXIMUM SIZE OF A SCREEN ALLOWED BY CONFIGURATION DATA — 305

DETERMINE A NUMBER OF CONCURRENT BOTS THAT ACCESS A SAME VIRTUAL MACHINE IN A PREDETERMINED TIMEFRAME — 310

SPLITS A WIDTH AND A HEIGHT OF A SCREEN BY A NUMBER OF BOTS — 315

ALLOCATES A SUB-SCREEN OF THE SPLIT SCREEN TO EACH OF THE BOTS — 320

EXECUTING INSTRUCTIONS IN EACH OF THE BOTS IN PARALLEL ON A CORRESPONDING SUB-SCREEN — 325

FIG. 3

RECEIVE CODE
INSTRUCTIONS ⟋ 330

ANALYZE THE CODE
INSTRUCTIONS TO PROVIDE
INSTRUCTIONS ON
SPLITTING A SCREEN OF A
SAME VIRTUAL MACHINE ⟋ 335

DOWNLOAD THE
INSTRUCTIONS ⟋ 340

SPLIT THE SCREEN BASED
ON THE INSTRUCTIONS TO
A PLURALITY OF SCREEN
AREAS ⟋ 345

EXECUTE INSTRUCTIONS
IN PARALLEL ON A
CORRESPONDING SCREEN
BY SIMULATING CLICKS
AND TYPING AT A
KEYBOARD OF A BOT ⟋ 350

ROBOTIC SHARED ACCESS

BACKGROUND

Aspects of the present invention relate generally to a robotic shared access and, more particularly, to a robotic shared access to hardware and software resources.

Robotic process automation (RPA) bots are run on dedicated virtual machines. In other words, each of the RPA bots use dedicated logins with a dedicated server license to mimic human behavior when a plurality of RPA bots are accessing a same virtual machine.

SUMMARY

In a first aspect of the invention, there is a computer-implemented method including: detecting, by a processor set, a maximum size of a screen within a same virtual machine allowed by configuration data; determining, by the processor set, a number of concurrent bots that access the same virtual machine within a predetermined timeframe; splitting, by the processor set, a width and a height of the screen by the number of the concurrent bots; allocating, by the processor set, a sub-screen of a split screen to each of the concurrent bots; and executing, by the processor set, a code package for each the concurrent bots within an allocated sub-screen within the same virtual machine in the predetermined timeframe.

In another aspect of the invention, there is a computer program product including one or more computer readable storage media having program instructions collectively stored on the one or more computer readable storage media. The program instructions are executable to: detect a maximum size of a screen within a same virtual machine allowed by configuration data; determine a number of concurrent bots that access the same virtual machine within a predetermined timeframe; split a width and a height of the screen by the number of the concurrent bots; allocate a sub-screen of a split screen to each of the concurrent bots; and execute a code package for each the concurrent bots within an allocated sub-screen within the same virtual machine in the predetermined timeframe.

In another aspect of the invention, there is a system including a processor set, one or more computer readable storage media, and program instructions collectively stored on the one or more computer readable storage media. The program instructions are executable to: detect a maximum size of a screen within a same computing system allowed by configuration data; determine a number of concurrent bots that access the same computing system within a predetermined timeframe; split a width and a height of the screen by the number of the concurrent bots; allocate a sub-screen of a split screen to each of the concurrent bots; and execute a code package for each the concurrent bots within an allocated sub-screen within the same computing system in the predetermined timeframe. Each of the concurrent bots execute a separate and independent code package from code packages of remaining bots.

BRIEF DESCRIPTION OF THE DRAWINGS

Aspects of the present invention are described in the detailed description which follows, in reference to the noted plurality of drawings by way of non-limiting examples of exemplary embodiments of the present invention.

FIG. 1 depicts a computing environment according to an embodiment of the present invention.

FIG. 3 shows a flowchart of an exemplary method of the robot coordinator server in accordance with aspects of the present invention.

DETAILED DESCRIPTION

Figure 2:
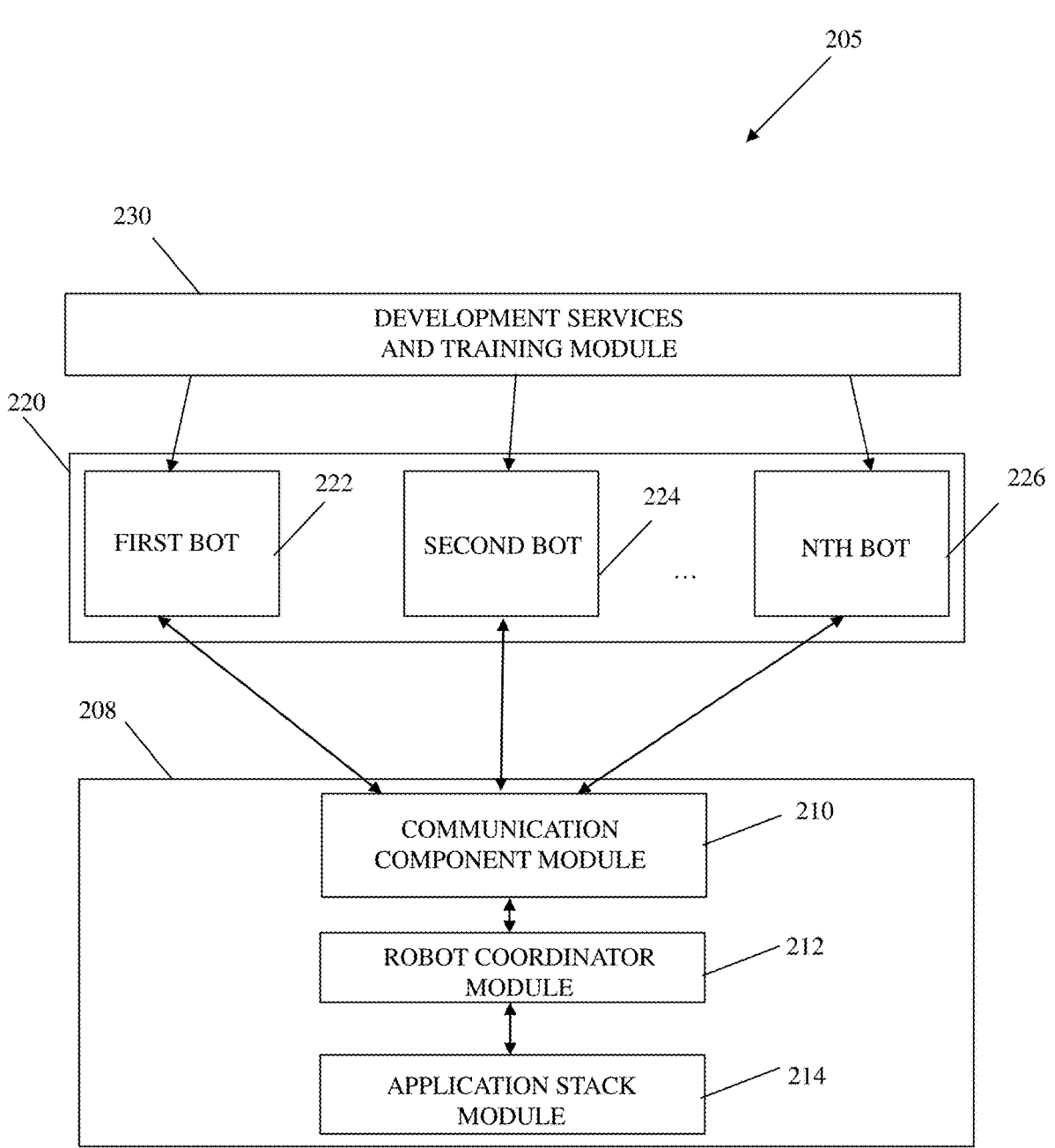
FIG. 2 shows a block diagram of an exemplary environment of a robot coordinator server in accordance with aspects of the present invention.

Aspects of the present invention relate generally to a robotic shared access and, more particularly, to a robotic shared access to hardware and software resources. Embodiments of the present invention allow a plurality of robot process automation (RPA) bots to run on a same machine using a same login account to reduce hardware and software waste in comparison to conventional RPA bot systems. Embodiments of the present invention include a robot coordinator module that executes a plurality of RPA processes on a same virtual machine in a same login account. Embodiments of the present invention split a screen of a virtual machine remote desktop session and allow a plurality of RPA bots to work together. Embodiments of the present invention allow each of the plurality of RPA bots to work together in the virtual machine remote desktop session by allowing each of the plurality of RPA bots to work in a portion of the split screen. Embodiments of the present invention reduce hardware and software resource usages by allowing the plurality of RPA bots to work together in a same virtual machine remote desktop session. Embodiments of the present invention allow the plurality of RPA bots to share resources of the same virtual machine remote desktop session using a prioritization mechanism. However, embodiments of the present invention are not limited to a virtual machine. Embodiments of the present invention area are also directed to a computing system.

Embodiments of the present invention allow a plurality of RPA bots to work together in a same virtual machine remote desktop session using a same login account. Conventional RPA bots require each of the plurality of RPA bots to connect to the same virtual machine using dedicated login accounts. In particular, as conventional RPA bots are not able to work together in a same virtual remote desktop session using a same login account, conventional RPA bots lead to wasted software and hardware resources and negative impacts on environmental sustainability, increased costs due to using dedicated login accounts, and increased wait time due to RPA bots not being able to concurrently work together in the same virtual remote desktop session using the same login account. Embodiments of the present invention allow each of the plurality of RPA bots to work concurrently in a portion of a screen of a virtual remote desktop session using a same login account.

Embodiments of the present invention provide user friendly RPA automation tools which are run on a computing infrastructure without any code changes. Accordingly, implementations of aspects of the present invention provide an improvement (i.e., technical solution) to a problem arising in the technical field of RPA bots. In particular, embodiments of the present invention provide for sharing hardware and software resources between a plurality of RPA bots using a same login account. Embodiments of the present invention split a screen such that each of a plurality of RPA bots are able to work concurrently on a portion of the split screen. Also, embodiments of the present invention may not be performed in a human mind because aspects of the present invention comprise using RPA bots on a same virtual machine remote desktop session with a same login account. Further, these implementations of the present invention improve the functioning of the computer by reducing consumption of hardware and software resources, improving environmental sustainability, and reducing wait times of RPA bots.

Implementations of the invention are necessarily rooted in computer technology. For example, the step of executing a code package of each a plurality of concurrent bots within an allocated sub-screen within a same virtual machine in a predetermined timeframe is computer-based and cannot be performed in the human mind. In particular, utilizing RPA bots on a same virtual machine remote desktop session with a same login account is rooted in computer technology. Further, it is simply not possible for the human mind, or for a person using pen and paper, to perform the functions of the RPA bots on the same virtual machine remote desktop session with the same login account.

Aspects of the present invention include a method, system, and computer program product for sharing hardware and software resources between a plurality of RPA bots which are not designed or programmed for concurrent access to shared resources. For example, a computer-implemented method includes: receiving a plurality of requests, each request from a different RPA bot to access a virtual machine (VM); splitting a screen of the virtual machine into a plurality of areas, each of the plurality of areas corresponding to a RPA bot requesting access to the VM; and concurrently receiving, by a robot coordinating component, a plurality of commands from each of the plurality of RPA bots and redirecting the plurality of commands to a corresponding area associated with each of the RPA bots. The computer-implemented method may also include pausing redirecting the plurality of commands from the RPA bots in response to one of the workflows associated with a particular RPA bot requiring access to full hardware and software resources of the computing environment. The computer-implemented method may also include executing commands associated with the plurality of RPA bots on different threads or processes on a same virtual machine.

It should be understood that, to the extent implementations of the invention collect, store, or employ personal information provided by, or obtained from, individuals, such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as robotic shared access code of block 200. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

FIG. 2 shows a block diagram of an exemplary environment 205 in accordance with aspects of the present invention. In embodiments, the environment 205 includes a robot coordinator server 208, which may comprise one or more instances of the computer 101 of FIG. 1. In other examples, the robot coordinator server 208 comprises one or more virtual machines or one or more containers running on one or more instances of the computer 101 of FIG. 1.

In embodiments, the robot coordinator server 208 of FIG. 2 comprises a communication component module 210, a robot coordinator module 212, and an application stack module 214, each of which may comprise modules of the code of block 200 of FIG. 1. Such modules may include routines, programs, objects, components, logic, data structures, and so on that perform particular tasks or implement particular data types that the code of block 200 uses to carry out the functions and/or methodologies of embodiments of the invention as described herein. These modules of the code of block 200 are executable by the processing circuitry 120 of FIG. 1 to perform the inventive methods as described herein. The robot coordinator server 208 may include additional or fewer modules than those shown in FIG. 2. In embodiments, separate modules may be integrated into a single module. Additionally, or alternatively, a single module may be implemented as multiple modules. Moreover, the quantity of devices and/or networks in the environment is not limited to what is shown in FIG. 2. In practice, the environment may include additional devices and/or networks; fewer devices and/or networks; different devices and/or networks; or differently arranged devices and/or networks than illustrated in FIG. 2.

In FIG. 2, and in accordance with aspects of the invention, the robot coordinator server 208 communicates with an orchestrator module 220. The orchestrator module 220 comprises a central command and control component which monitors the bots, transfers a code package to the bots, etc. The orchestrator module 220 also communicates with a development services and training module 230. In embodiments, the development services and training module 230 develops a code package and then sends the code package to the orchestrator module 220 so that the code package is transferred to the bots. In embodiments, the orchestrator module 220 comprises a first bot 222, a second bot 224, . . . , and a nth bot 226. In embodiments, n represents an integer representing the last bot. However, embodiments are not limited to the above example. In other embodiments, the orchestrator module 220 can include any plurality of bots, including only two bots. In embodiments, each of the plurality of bots in the orchestrator module 220 executes independent code which is different from code in the remaining bots of the plurality of bots.

In embodiments of FIG. 2, the communication module 210 of the robot communication server 208 receives information from each of the plurality of bots (e.g., a first bot 222, a second bot 224, . . . ,and a nth bot 226) and sends the information to the robot coordinator module 212. The robot coordinator module 212 also sends other information to the plurality of bots via the communication module 210. In further embodiments, the robot coordinator module 212 detects a maximum size of a screen allowed by configuration data. For example, the configuration data includes a maximum size of a screen of a same virtual machine. Accordingly, the robot coordinator module 212 detects the maximum size of the screen by receiving the maximum size of the screen from the configuration data. The robot coordinator module 212 determines a number of concurrent bots that access a same virtual machine in a predetermined timeframe. In particular with respect to FIG. 2, the robot coordinator module 212 determines that there are n number of bots requesting access to the same virtual machine. The robot coordinator module 212 then splits a width and a height of the screen by the n number of bots. The robot coordinator module 212 then allocates a sub-screen of the split screen to each of the n number of bots. In embodiments, n is an integer value greater than one. In further embodiments, the robot coordinator module 212 places the width and height information in a message together with a next instruction to be executed in each sub-screen of the split screen. In other embodiments, each bot of the n bots executes a code package on different threads in a same virtual machine by splitting the screen of the same virtual machine into different sections and executing the code package in a corresponding sub-screen of the split screen.

In embodiments of FIG. 2, the application stack module 214 comprises all software applications which are installed on the same virtual machine and allows the plurality of bots to execute. For example, the application stack module 212 may comprise Windows, Apache OpenOffice, Microsoft Office, etc. The application stack module 214 communicates with the robot coordinator module 212 for communicating with the software applications.

FIG. 3 shows a flowchart of an exemplary method of the robot coordinator server in accordance with aspects of the present invention. Steps of the method may be carried out in the environment of FIG. 2 and are described with reference to elements depicted in FIG. 2.

At step 305, the system detects, at the robot coordinator module 212, a maximum size of a screen allowed by configuration data. In embodiments and as described with regards to FIG. 2. the robot coordinator module 212 detects the maximum size of the screen allowed by receiving the maximum size of the screen from the configuration data. At step 310, the system determines, at the robot coordinator module 212, a number of concurrent bots that access a same virtual machine in a predetermined timeframe. At step 315, the system splits, at the robot coordinator module 212, a width and a height of a screen by a number of bots. At step 320, the system allocates, at the robot coordinator module 212, a sub-screen of the split screen to each of the plurality of bots. At step 325, the system executes, at the robot coordinator module 212, instructions in each of the bots in parallel on a corresponding sub-screen of the split screen.

Figure 4:
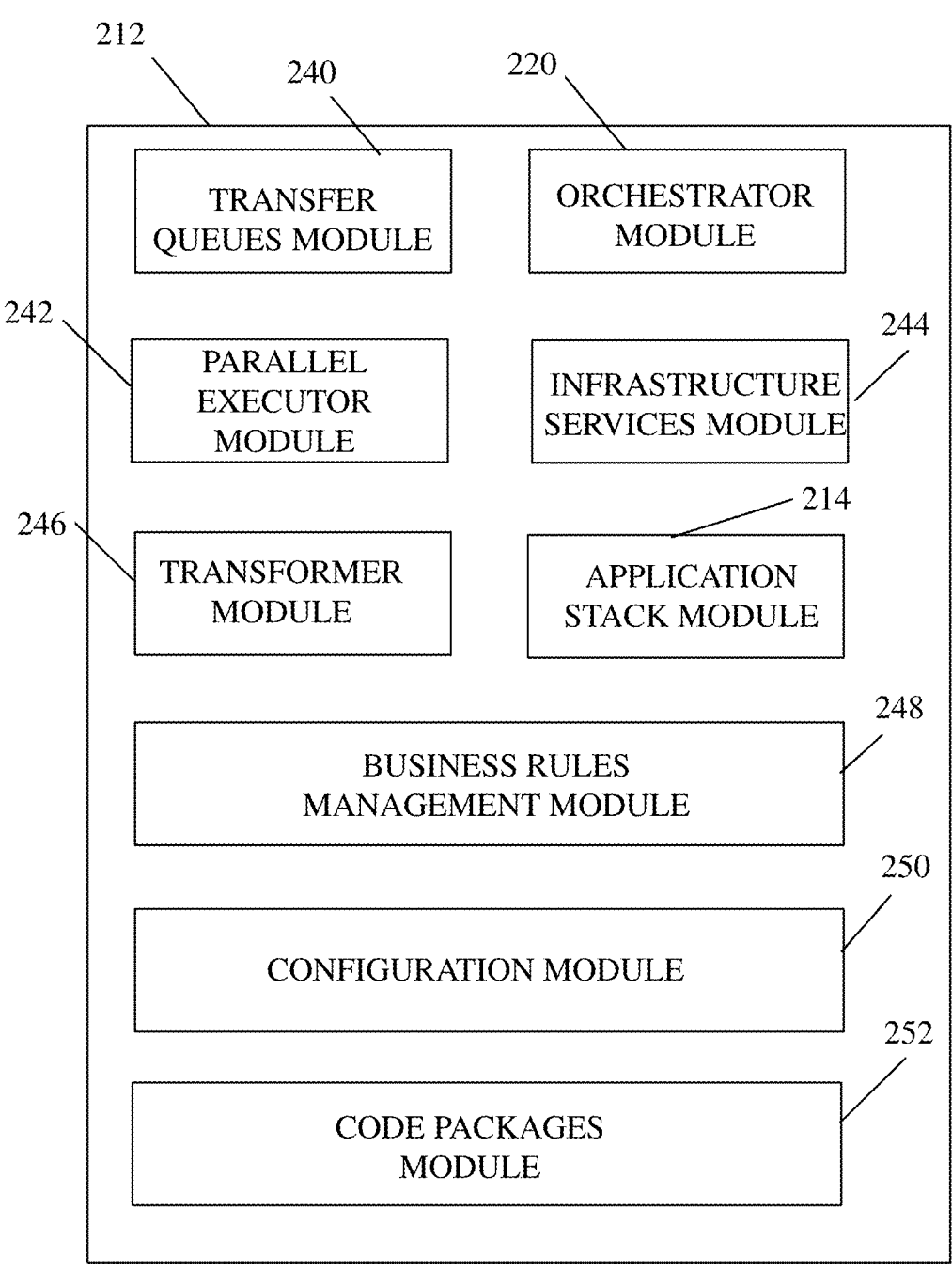
FIG. 4 shows a block diagram of an exemplary environment of the robot coordinator module in accordance with aspects of the present invention.

FIG. 4 shows a block diagram of an exemplary environment of the robot coordinator module in accordance with aspects of the present invention. In embodiments, the robot coordinator module 212 includes the application stack module 214, the orchestrator module 220, a transfer queues module 240, a parallel executor module 242, an infrastructure services module 244, a transformer module 246, a business rules management module 248, a configuration module 250, a code packages module 252.

Figure 5:
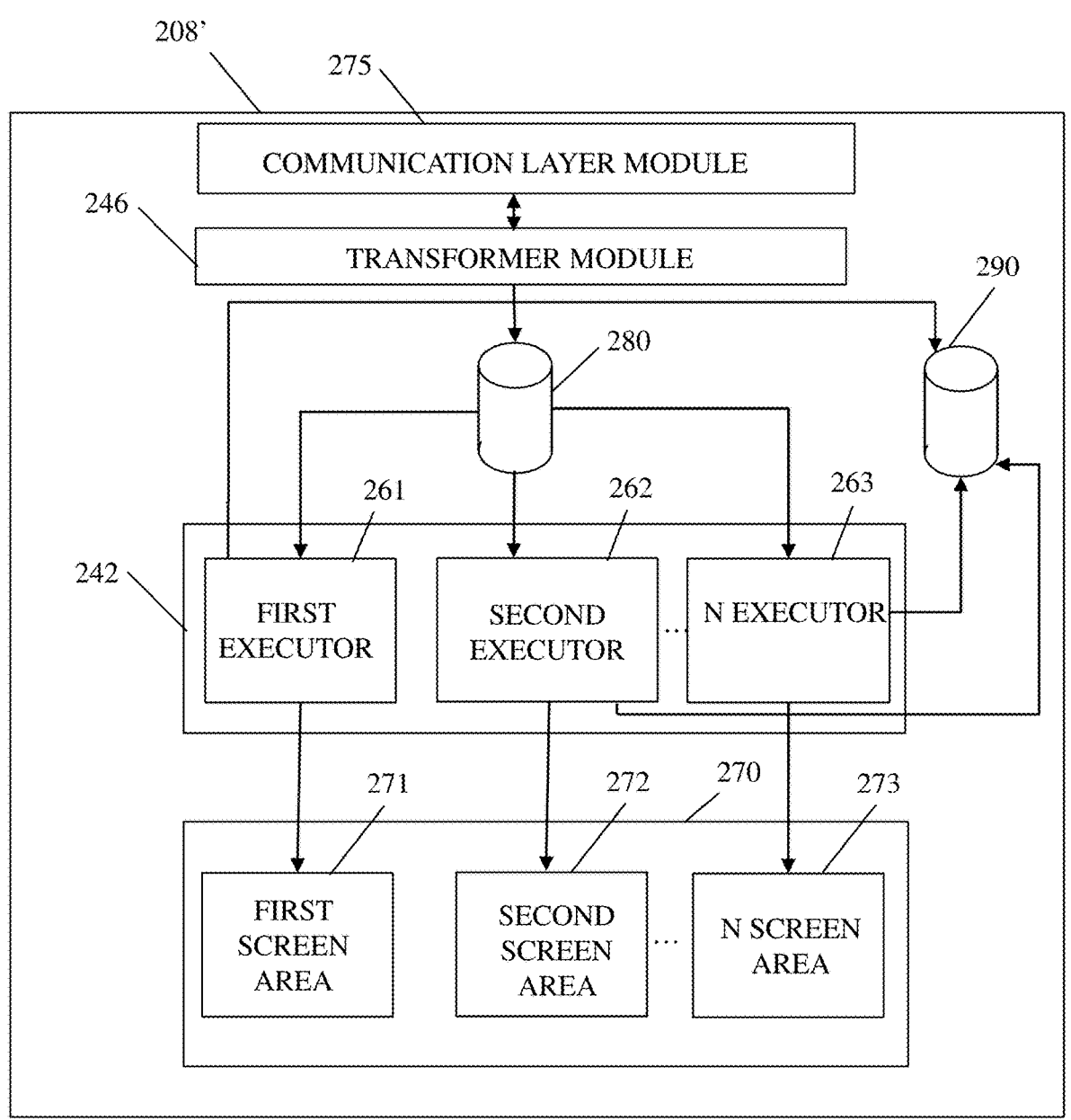
FIG. 5 shows a block diagram of another exemplary environment of the robot coordinator server in accordance with aspects of the present invention.

In embodiments of FIG. 4, the transfer queues module 240 is a queuing system with a request queue 280 (shown in FIG. 5) and a response queue 290 (shown in FIG. 5). In particular, the parallel executor module 242 comprises a plurality of executors which take a code instruction from the request queue 280 and executes the code instruction on the bots within the virtual machine. Then, a result of the execution of the virtual machine is then placed in the response queue 290 in which the orchestrator module 220 downloads the result of the execution. In embodiments of the virtual machine, shared resources include a keyboard and a mouse. Further, in embodiments, the process of the transfer queues module 240 is asynchronous such that a specific instruction in a code of a bot is mixed with instructions from a code of another robot.

In embodiments of FIG. 4, the parallel executor module 242 starts multiple parallel executors which are threads. In embodiments, the parallel executor module 242 executes the instructions in the request queue 280 (shown in FIG. 5) in parallel by executing simulated clicks and keyboard typing for each of the plurality of bots. Each executor (e.g., first executor 261, second executor 262, . . . n executor 263 as shown in FIG. 5) comprises one associated input from the request queue 280 and one associated output to the response queue 290 (shown in FIG. 5). In embodiments, each thread corresponds with a robot. However, in other embodiments, there is only one executor for all of plurality of robots to perform serialization of the execution.

In embodiments of FIG. 4, the transformer module 246 analyzes code submitted by the orchestrator module 220 to the robot coordinator module 212. Accordingly, the transformer module 246 interprets instructions on a screen and determines how many parts to split a screen of a same virtual machine. The transformer module 246 allows each bot thread to have a dedicated working area (i.e., sub-screen) in the same virtual machine. In further embodiments, the transformer module 246 uses additional split algorithms. The transformer module 246 processes the code in batches at a start of an execution session. In other embodiments, the transformer module 246 processes code as bots are added at a later time by the orchestrator module 220.

In embodiments of FIG. 4, the business rules management module 248 implements rules for allowing the robot coordinator module 212 to skip specific code instructions in an area of a screen associated with a specific bot. The business rules management module 248 also implements specific algorithms which correspond with use cases. In embodiments, the business rules management 248 is able to configure the response of the robot coordinator 212 based on the request queue 280 and the response queue 290. In this scenario, a specific bot has full access to resources of the same virtual machine for at least one instruction. For example, the business rules management 248 will allow the robot coordinator module 212 to temporarily minimize all windows used by other robots, execute code instructions for the bot with full virtual machine access (i.e., a full screen) for a predetermined period of time, and then resume work of the other bots by pausing the bot with full virtual machine access and restore all windows of the split screen. The business rules management module 248 also includes stored rules which are based on a set of triggers and the code algorithm is stored in the transformer module 246.

In embodiments of FIG. 4, the configuration module 250 includes specific configuration data available to the robot coordinator module 212. For example, the specific configuration data includes a number of executor threads which are run in parallel. Accordingly, the robot coordinator module 212 improves overall performance depending on a number of cores in a central processing unit (CPU) of the same virtual machine. Additional configuration data is also available based on a specific context of a solution, such as connection details for the orchestrator module 220, authentication information, etc.

In embodiments of FIG. 4, the code packages module 252 includes a code package that bots are using. In particular, the code package is uploaded by programmers in the orchestrator module 220 and then transferred through a communication channel (e.g., an API layer) to the robot coordinator module 212 for parallel processing on the same virtual machine. In other embodiments, sone vendors allow a code package to be executed on bots without a need for the orchestrator module 220.

In embodiments of FIG. 4, the infrastructure services module 244 includes all hardware components that a robot may need to function, such as access to a mouse (i.e., an ability to execute a synthetic clock), access to a keyboard, and access to hardware authentication tokens, etc.

The steps of FIG. 3 can also be performed by the transformer module 246. In particular, as discussed with regards to FIG. 3, at step 305, the system detects, at the transformer module 246, a maximum size of a screen allowed by configuration data. At step 310, the system determines, at the transformer module 246, a number of concurrent robots that access a same virtual machine in a predetermined timeframe. At step 315, the system splits, at the transformer module 246, a width and a height of a screen by a number of bots. At step 320, the system allocates, at the transformer module 246, a sub-screen of the split screen to each of the plurality of bots. At step 325, the system executes, at the transformer module 246, instructions in each of the bots in parallel on a corresponding sub-screen of the split screen.

FIG. 5 shows a block diagram of another exemplary environment of the robot coordinator server in accordance with aspects of the present invention. In the robot coordinator server 208', the communication layer module 275 communicates with the transformer module 246. The transformer module 246 receives code instructions corresponding to a plurality of bots and analyzes the code instructions corresponding to a plurality of bots submitted by the orchestrator module 220 via the communication layer module 275. Accordingly, the transformer module 246 interprets instructions on a screen and determines how many parts to split a screen of a same virtual machine based on the analysis of the code instructions submitted. The transformer module 246 allows each bot thread to have a dedicated working area (i.e., sub-screen) in the same virtual machine. Then, the transformer module 246 sends instructions to the request queue 280 for each executor of the parallel executor module 242.

In embodiments of FIG. 5, the request queue 280 sends the instructions to the parallel executor module 242 such that the plurality of executors (e.g., first executor 261, second executor 262, . . . , and the n executor) receives the instructions. In particular, the first executor 261 downloads a first code instruction from the request queue 280, the second executor 262 downloads a second code instruction from the request queue 280, and the third executor 263 downloads a third code instruction form the request queue 280. In embodiments, each executor of the parallel executor module 242 runs a separate independent code instruction from remaining executors. Further, each executor of the plurality of executors outputs a corresponding code instruction to the response queue 290. The orchestrator module 220 downloads the corresponding code instruction from the response queue 290.

In embodiments of FIG. 5, each executor of the plurality of executors (e.g., first executor 261, second executor 262, . . . , and the n executor) communicates with a screen 270 based on the code instructions to split the screen 270 into a first screen area 271, a second screen area 272, . . . , and a n screen area 273 corresponding to the first executor 261, the second executor 262, . . . , and the n executor and the first bot 222, second bot 224, and the nth bot 226. Each executor executes the code instructions in parallel on a corresponding screen by simulating clicks and typing at a keyboard at a corresponding bot. For example, a first executor 261 executes the code instructions for a first bot 222 on a corresponding first screen area 271 by simulating clicks and typing at a keyboard of the first bot 222. Also, if there is a direct conflict between two bots (e.g., first bot 222 and second bot 224) executing code instructions at a same time, a second bot (e.g., second bot 224) can be paused to allow for the first bot 222 to execute the code instructions on a full screen for the same virtual machine. For example, the business rules management module 248 stores execution priorities for each of the first bot 222, the second bot 224, and the nth bot 226 which determines which bot is paused and which bot is allowed to execute.

Figure 6:
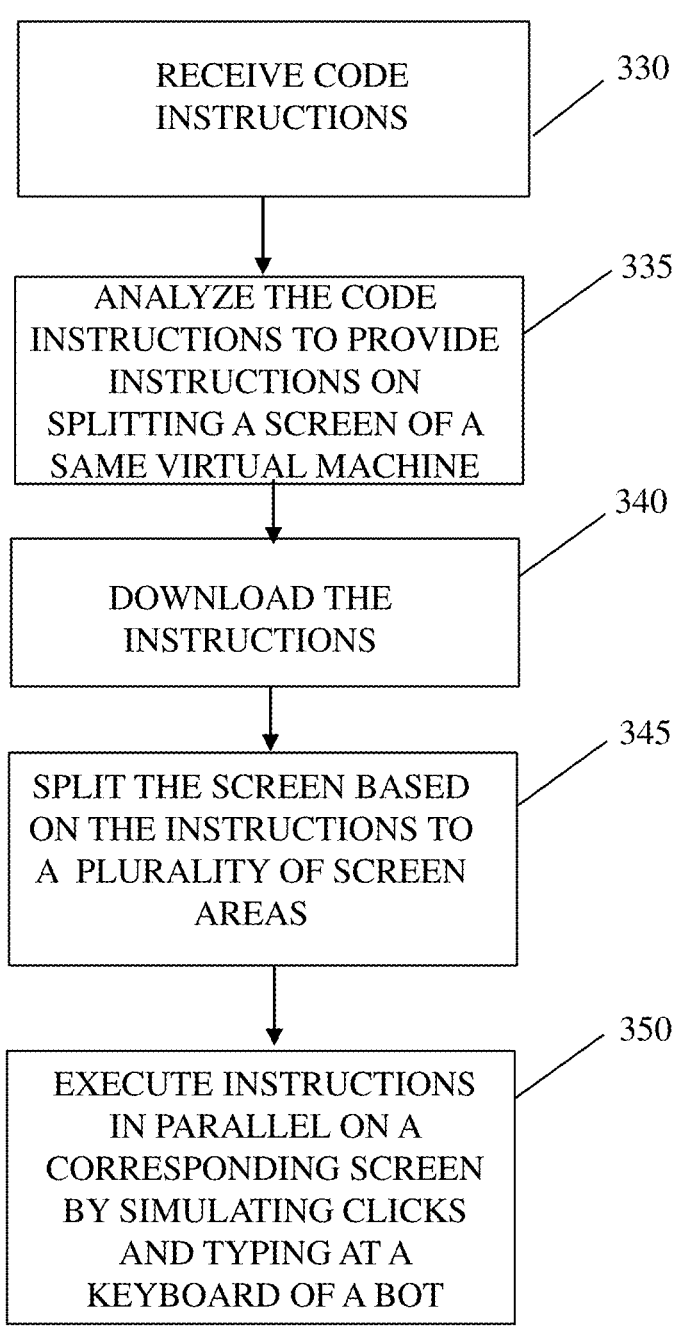
FIG. 6 shows a flowchart of the exemplary method of the robot coordinator server in accordance with aspects of the present invention.

FIG. 6 shows a flowchart of the exemplary method of the robot coordinator server in accordance with aspects of the present invention. Steps of the method may be carried out in the environment of FIG. 5 and are described with reference to elements depicted in FIG. 5.

At step 330, the system receives, at the transformer module 246, code instructions corresponding to a plurality of bots. At step 335, the system analyzes, at the transformer module 246, the code instructions and provides instructions on splitting a screen of a same virtual machine. In embodiments, and as described with regards to FIG. 5, the transformer module 246 provides the instructions to a response queue 280. At step 340, the system downloads, at the parallel executor module 242, the instructions from the response queue 280. In embodiments, and as described with regards to FIG. 5, the first executor 261 of the parallel executor module 242 downloads a first code instruction from the request queue 280, the second executor 262 of the parallel executor module 242 downloads a second code instruction from the request queue 280, and the third executor 263 of the parallel executor module 242 downloads a third code instruction form the request queue 280.

At step 345, the system communicates, at the parallel executor module 242, with a screen based on the code instructions to split the screen 270 into a plurality of screen areas. At step 350, the system executes, at the parallel executor module 242, code instructions in parallel on a corresponding screen of the plurality of screen areas by simulating clicks and typing at a keyboard at a corresponding bot.

Figure 7:
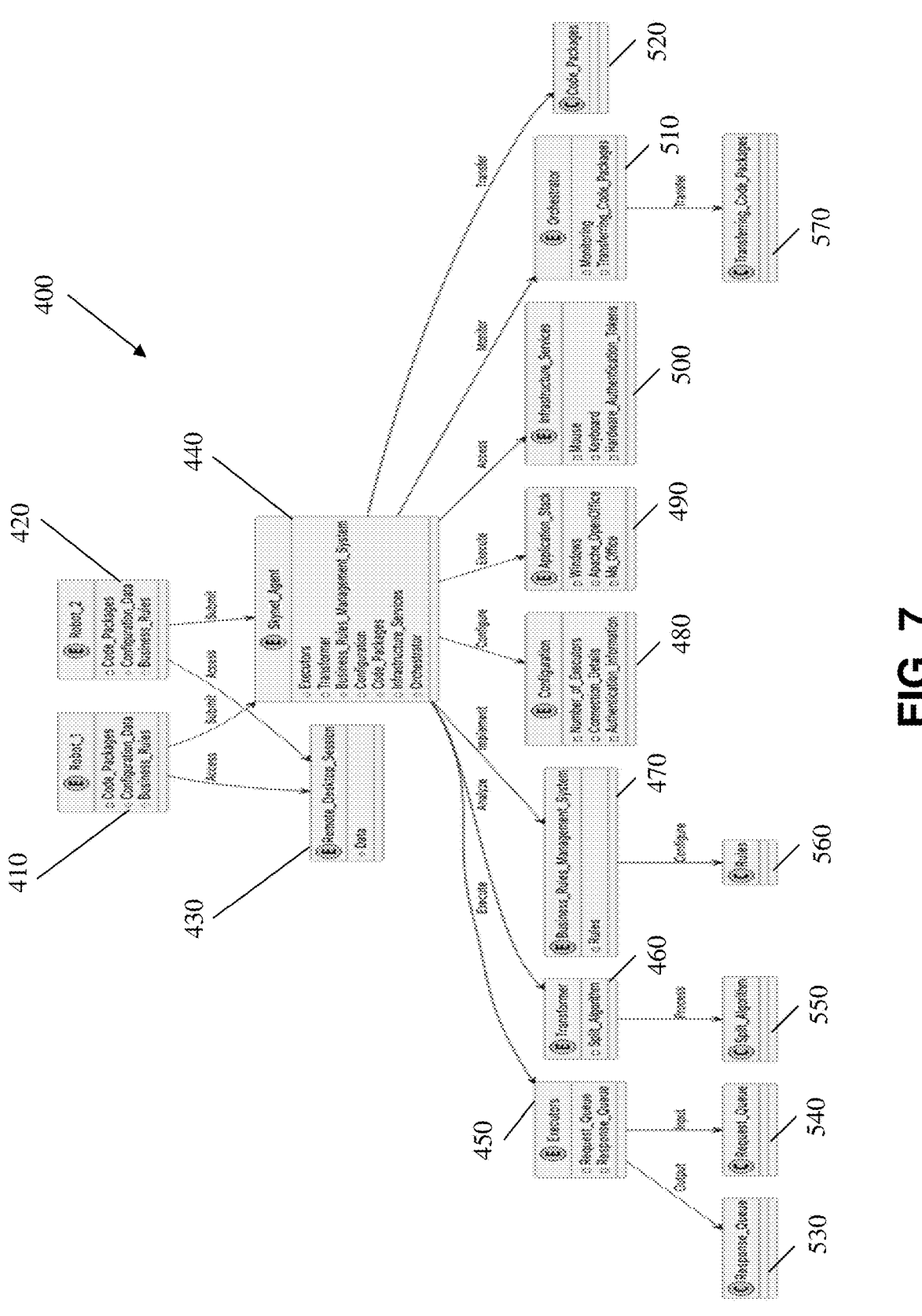
FIG. 7 shows an entity relationship diagram of the robot coordinator server in accordance with aspects of the present invention.

FIG. 7 shows an entity relationship diagram of the robot coordinator server in accordance with aspects of the present invention. In FIG. 7, the entity relationship diagram 400 includes entities comprising a robot_1 410, a robot_2 420, a remote_desktop_session 430, skynet_agent 440, executors 450, transformer 460, a business_rules_management_system 470, configuration 480, an application_stack 490, infrastructure_services 500, an orchestrator 510 and classes comprising code_packages 520, response_queue 530, request_queue 540, split_algorithm 550, rules 560, and transferring_code_packages 570.

In embodiments, the robot_1 410 includes code_packages, configuration_data, and business_rules to access the remote_desktop_session 430 and submit to the skynet_agent 440. The robot_2 420 includes code_packages, configuration_data, and business_rules to access the remote_desktop_session 430 and submit to the skynet_agent 440. The remote_desktop_session 430 includes data and the skynet_agent 440 includes executors, transformer, business_rules_management_system, configuration, code_packages, infrastructure_services, and orchestrator.

In embodiments, the skynet_agent 440 corresponds to a robot coordinator module. In embodiments, the skynet_agent 440 analyzes and executes the executors 450 and transformer 460, implements the business_rules_management_system 470, configure the configuration 480, execute the application_stack 490, access the infrastructure_services 500, monitor the orchestrator 410, and transfer the code_packages 520. The executors 450 include request_queue and response_queue to output to the response_queue 530 and input to the request_queue 540. The transformer 460 includes a split_algorithm and process the split_algorithm 550. The business_rules_management_system 470 includes rules and configures the rules 560.

In embodiments, the configuration 480 includes number_of_executors, connection_details, and authentication_information. The application_stack 490 includes windows, apache_openoffice, and ms_office. The infrastructure_services 500 include a mouse, a keyboard, and hardware_authentication_tokens. The orchestrator 510 includes monitoring and transferring_code_packages and transfers the transferring_code_packages 570.

In embodiments, the robot coordinator server 208 is configured to be used in different scenarios. In an example, an RPA senior programmer from Germany has a project which uses multiple robots on the same virtual machine and running at the same time. The RPA senior programmer wants to reduce costs associated with running the robots on multiple machines. The RPA senior programmer uses the robot coordinator server 208 to manage the resources of the virtual machine and to allow multiple robots to run on the same virtual machine. The robot coordinator server 208 splits the virtual machine screen into multiple sections, allowing the robots to access the shared resources without any conflicts. The robot coordinator server 208 also allows the robots to be paused if the robots need to use the full resources of the machine. Accordingly, the robot coordinator server 208 allows for a good operational approach for the RPA resources that are being dynamically managed as required by an overall automation environment.

In an example, an RPA junior programmer runs multiple robots on a same virtual machine. The robots need to access the same shared resources. Further, the RPA junior programmer wants to reduce the hardware and software resources usage. The RPA junior programmer works from a lab in Frankfurt, Germany and uses the robot coordinator server 208 to coordinate the robots so that the robots run on the same virtual machine and access the shared resources. The robot coordinator server 208 splits the virtual machine screen into multiple sections, allowing the robots to access the shared resources without any conflicts. Accordingly, the robot coordinator server 208 yields a high level of automation savings and operational capabilities is achieved. Thus, the RPA junior programmer executes his new automation jobs in real time for maximum efficiency at reduced processing costs. The robot coordinator server 208 allows the robots to be paused if the robots need to use full resources of the machine and scales an automation solution. The RPA junior programmer is amazed at the improved efficiency.

In another example, a worker works within a banking industry from Tampa, Florida in the United States. The worker is responsible for an effective deployment of a new team approach for the entire banking industry. Banks use the robot coordinator server 208 to manage their RPA initiatives. The robot coordinator server 208 allows the robots to run on the same virtual machine, which reduces the hardware and software resource usages and makes the robots more efficient. The robot coordinator server 208 splits the virtual machine screen into multiple sections, allowing the robots to access the shared resources without any conflicts. The robot coordinator server 208 allows the robots to be paused if the robots need to use full resources of the machine. Multiple new banks have already agreed to migrate to this new approach within the industry. The worker is happy with the new team approach and the industry adoption. The worker is also happy that the aggressive new migration efforts are working.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer 101 of FIG. 1, can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer 101 of FIG. 1, from a computer readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:

detecting, by a processor set, a maximum size of a screen within a same virtual machine allowed by configuration data;

determining, by the processor set, a number of concurrent bots that access the same virtual machine within a predetermined timeframe;

splitting, by the processor set, a width and a height of the screen by the number of the concurrent bots;

allocating, by the processor set, a sub-screen of the split screen to each of the concurrent bots;

executing, by the processor set, a code package for each of the concurrent bots within the allocated sub-screen within the same virtual machine in the predetermined timeframe;

determining, by the processor set, that a first bot of the concurrent bots is executing a first code package at a same time that a second bot of the concurrent bots is executing a second code package; and executing, by the processor set, the first code package for the first bot on a full screen of the same virtual machine in response to determining that the first bot of the concurrent bots is executing the first code package at the same time that the second bot of the current bots is executing the second code package.

2. The computer-implemented method of claim 1, wherein the number of concurrent bots comprise at least three bots.

3. The computer-implemented method of claim 2, wherein the splitting the width and the height of the screen by the number of concurrent bots comprises splitting the width and the height of the screen into a plurality of sub-screens which correspond with the number of concurrent bots, and the second bot is paused to allow executing of the first code package for the first bot on the full screen of the same virtual machine.

4. The computer-implemented method of claim 1, wherein each of the concurrent bots executes a separate and independent code package from code packages of remaining bots.

5. The computer-implemented method of claim 1, further comprising pausing at least one bot of the concurrent bots which has a direct conflict with an other bot of the concurrent bots within the predetermined timeframe.

6. The computer-implemented method of claim 5, further comprising executing a code package of the other bot within a full screen within the same virtual machine.

7. The computer-implemented method of claim 5, wherein the other bot of the concurrent bots has a higher priority than the at least one bot of the concurrent bots.

8. The computer-implemented method of claim 1, wherein the executing the code package of each of the concurrent bots within the allocated sub-screen within the same virtual machine further comprises simulating clicks and typing at a keyboard of each of the concurrent bots.

9. The computer-implemented method of claim 1, wherein the configuration data includes a number of executor threads which run in parallel.

10. The computer-implemented method of claim 1, wherein the executing the code package of each of the concurrent bots within the allocated sub-screen within the same virtual machine further comprises accessing shared resources within the same virtual machine by the concurrent bots.

11. The computer-implemented method of claim 10, wherein the shared resources comprise at least one software resource.

12. The computer-implemented method of claim 10, wherein the shared resources comprise at least one hardware resource.

13. A computer program product comprising one or more computer readable storage media having program instructions collectively stored on the one or more computer readable storage media, the program instructions executable to:

detect a maximum size of a screen within a same virtual machine allowed by configuration data;

determine a number of concurrent bots that access the same virtual machine within a predetermined timeframe;

split a width and a height of the screen by the number of the concurrent bots;

allocate a sub-screen of the split screen to each of the concurrent bots;

execute a code package for each of the concurrent bots within the allocated sub-screen within the same virtual machine in the predetermined timeframe;

determine that a first bot of the concurrent bots is executing a first code package at a same time that a second bot of the concurrent bots is executing a second code package; and execute the first code package for the first bot on a full screen of the same virtual machine in response to determining that the first bot of the concurrent bots is executing the first code package at the same time that the second bot of the current bots is executing the second code package.

14. The computer program product of claim 13, wherein the number of concurrent bots comprise at least three bots.

15. The computer program product of claim 14, wherein the splitting the width and the height of the screen by the number of concurrent bots comprises splitting the width and the height of the screen into a plurality of sub-screens which correspond with the number of concurrent bots, and the second bot is paused to allow executing of the first code package for the first bot on the full screen of the same virtual machine.

16. The computer program product of claim 13, wherein the program instructions are further executable to pause at least one bot of the concurrent bots which has a direct conflict with an other bot of the concurrent bots within the predetermined timeframe.

17. The computer program product of claim 16, wherein the program instructions are further executable to execute a code package of the other bot within a full screen within the same virtual machine.

18. The computer program product of claim 16, wherein the other bot of the concurrent bots has a higher priority than the at least one bot of the concurrent bots.

19. The computer program product of claim 13, wherein the executing the code package of each of the concurrent bots within an allocated sub-screen within the same virtual machine further comprises accessing shared resources within the same virtual machine by the concurrent bots.

20. A system comprising:

a processor set, one or more computer readable storage media, and program instructions collectively stored on the one or more computer readable storage media, the program instructions executable to:

detect a maximum size of a screen within a same computing system allowed by configuration data;

determine a number of concurrent bots that access the same computing system within a predetermined time-frame;

split a width and a height of the screen by the number of the concurrent bots;

allocate a sub-screen of the split screen to each of the concurrent bots;

execute a code package for each of the concurrent bots within the allocated sub-screen within the same computing system in the predetermined timeframe;

determine that a first bot of the concurrent bots is executing a first code package at a same time that a second bot of the concurrent bots is executing a second code package; and execute the first code package for the first bot on a full screen of the same virtual machine in response to determining that the first bot of the concurrent bots is executing the first code package at the same time that the second bot of the current bots is executing the second code package.

* * * * *